Aug. 10, 1965   L. HUNTER   3,199,208
VEHICLE WHEEL ALIGNMENT APPARATUS
Filed July 5, 1962   4 Sheets-Sheet 1

*INVENTOR.*
LEE HUNTER
BY
Gravely, Lieder & Woodruff
ATTORNEYS

INVENTOR.
LEE HUNTER

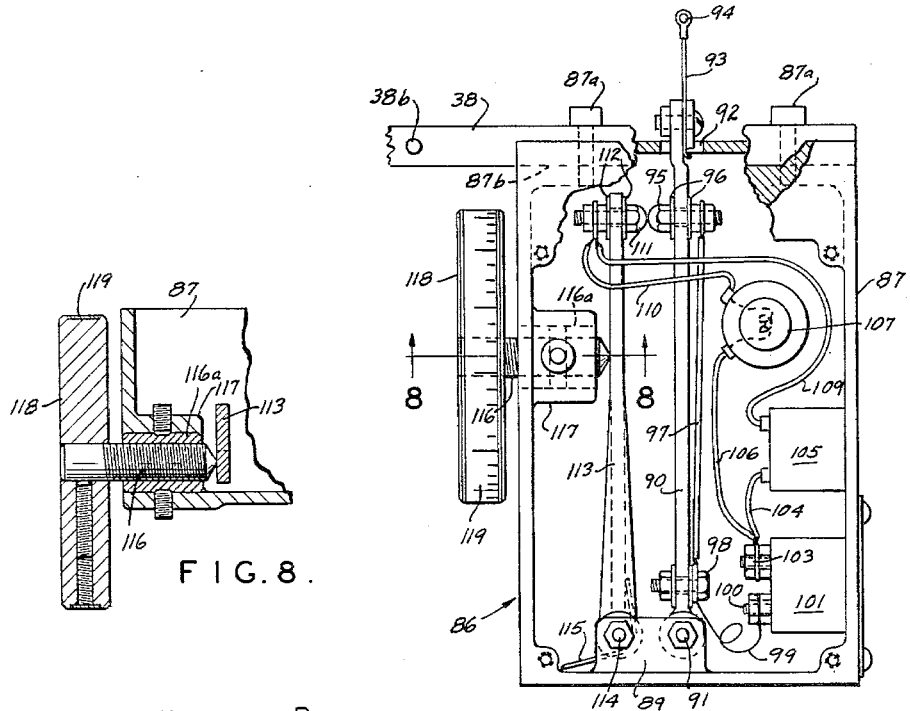
FIG. 8.
FIG. 7.
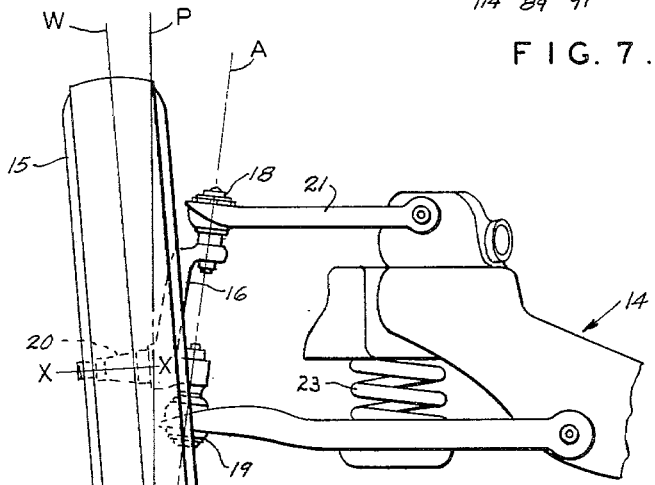
FIG. 9.

United States Patent Office 3,199,208
Patented Aug. 10, 1965

3,199,208
VEHICLE WHEEL ALIGNMENT APPARATUS
Lee Hunter, Rte. 1, Box 136, Creve Coeur, Mo.
Filed July 5, 1962, Ser. No. 207,486
7 Claims. (Cl. 33—203.18)

This invention relates to the art of measuring the wheel alignment characteristics of vehicles and is particularly related to improved apparatus which greatly simplifies the determination of such alignment factors as camber, caster and toe of the steerable wheels, and tracking alignment of the front and rear wheels.

Automobile wheel alignment is important to proper operation as, among other factors, tire wear, bearing life, driver fatigue and wheel tracking are dependent in one way or another upon correct alignment. Many devices have been proposed for determining alignment characteristics, but the art is still without efficient, simple and economical apparatus to quickly make such determinations without a considerable degree of skill or training experience.

It is an object of this invention to provide alignment apparatus for easily determining wheel aligment characteristics of vehicles in a direct manner.

It is an object to provide wheel alignment apparatus which may be easily installed and is simple and easy to operate.

It is a further object of this invention to provide a combination of means which cooperate to permit quick and easy determination of wheel toe measurement.

Another object of this invention is to provide wheel alignment apparatus with adjustable means for establishing a datum from which measurements may be made for camber, caster and toe characteristics.

These and other objects of this invention are accomplished in and by the apparatus described herein and shown in the accompanying drawings which form a part of this application.

In the drawings:

FIG. 7 is a greatly enlarged plan view, partly in section, of another portion of the apparatus seen in FIG. 1;

FIG. 8 is a sectional detail seen at line 8—8 in FIG. 7;

FIG. 9 is an enlarged fragmentary view of the wheel mounting for the right front wheel of the vehicle illustrated in FIG. 1 to show certain alignment characteristics thereof.

*Wheel alignment characteristics*

Figure 1:
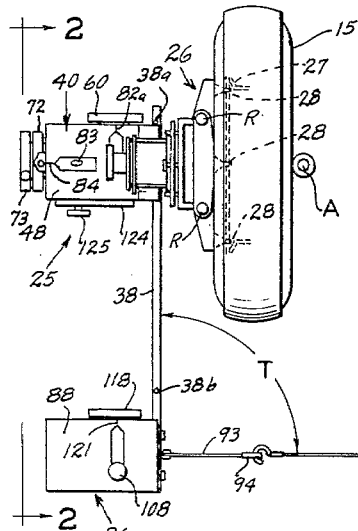
FIG. 1 is a plan view of the steerable wheels of a vehicle upon which the improved apparatus has been mounted in operative position.
Figure 1:
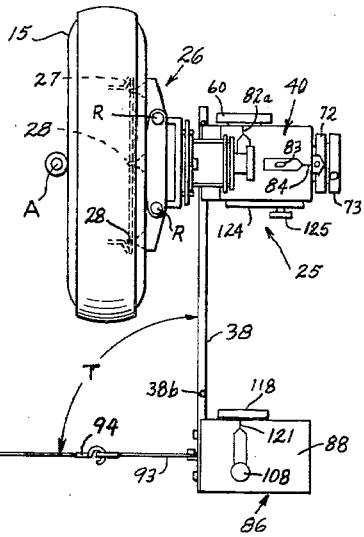
Figure 10:
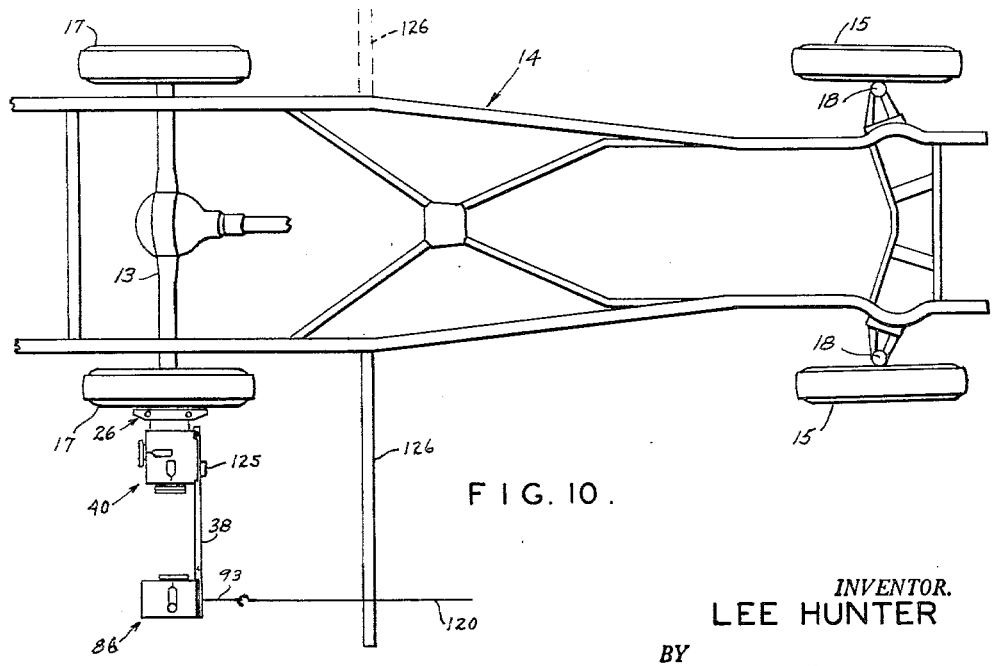
FIG. 10 is a plan view of a vehicle chassis to illustrate one of the uses for the apparatus of this invention.

First viewing FIGS. 1, 9 and 10, the vehicle chosen for purposes of illustrating the operation of the present apparatus includes a chassis 14 of main and secondary structural members constituting the sprung mass. This mass is suitably supported by spring means (not shown) from the unsprung mass which includes the front steerable wheels 15 and supporting spindle brackets 16, and the rear wheels 17 together with the axle housing assembly 13. Further reference will be made to FIG. 10 in connection with the use of the present apparatus for determining if the rear wheels 17 are properly set to track with the front wheels 15.

Turning now to FIG. 9 certain alignment characteristics will now be described in connection with the right front wheel of the vehicle. It will be understood that the same description will apply equally to the left front wheel, due regard being given to the reversed position of the parts. The right front wheel 15 is rotatably mounted on the spindle 20 of bracket 16, and the bracket 16 is operatively connected by upper ball joint 18 to a control arm 21 pivotally connected to a part of chassis 14. The bracket 16 has a lower ball joint 19 connected to a lower control arm 22 which is also pivoted on the chassis 14. The lower arm 22 furnishes the support for the usual suspension spring 23 which carries the weight of the adjacent sprung mass of the vehicle.

The spindle bracket 16 normally locates the ball joints 18 and 19 such that the wheel 15 may be turned for steering about the axis A—A, while the wheel 15 rotates about its spindle axis X—X. The optimum geometric relation of the spindle 20 to the ball joints 18 and 19 is such that the turning axis A—A and the axis W—W in the plane of the wheel 15 intersect at the surface S on which the wheel rolls to reduce the steering effort and to reduce tire wear due to sliding on surface S if the axes A—A and W—W do not coincide at the rolling surface. In the following description the axes A—A and W—W are described in relation to a perpendicular P—P to surface S.

Camber of the wheel 15 is the angular amount of inclination of the plane of the wheel W—W to the perpendicular P—P, so that the point of contact of the tire on surface S is as close to the point of intersection of the steering axis A—A on surface S as possible, although it usually is not exactly on such point due to the physical limitations of the wheel mounting spindle and brake mechanism. The camber angle is determined with the wheel 15 set in straight ahead position, of course allowance must be made for toe alignment between the pair of wheels 15. Accordingly, the camber angle is measured between the axis W—W and the perpendicular P—P.

Caster of the wheel is the angular amount of inclination of the turning axis A—A forwardly or rearwardly in the plane of the wheel and is usually determined at the spindle axis X—X. In the example of FIG. 9, the caster angle is the angular amount that the upper ball joint 18 is ahead of or to the rear of the lower ball joint 19. Positive caster is the angular amount that ball joint 18 is inclined toward the rear of the vehicle, and, of course, negative caster in the opposite condition.

King pin inclination is similar to the camber of the wheel in that it is the angular inclination of the axis A—A in FIG. 9 in the plane of the drawing sheet to the perpendicular P—P. The inclination of the king pin for older vehicles was measured along the axis of a solid pin element, but in the newer vehicles having ball joints, the term "king pin" inclination is a convenient way to refer to the inclination of the turning axis extending from the upper to the lower ball joints. It is the amount the lower ball joint extends outwardly beyond the upper ball joint to obtain the intersection of turning axis A—A with the surface S at or close to the point of tire contact on that surface.

Caster and king pin inclination are interrelated, and may be determined by measurements with the wheel 15 turned in through an angle of approximately 20° and turned out to approximately the same angular amount.

Wheel toe is the angular relation of the wheel 15 as measured between a horizontal line in the plane of the wheel and the longitudinal center line of the vehicle. It is usually determined by finding the difference in the distance between the wheels 15 horizontally in front of the spindles 15 and to the rear. When the front distance is less than at the rear the wheels 15 have toe-in.

Description of apparatus

The presently preferred apparatus is provided to determine the foregoing characteristics of steerable wheel alignment in a simple manner and with great accuracy. The apparatus is also useful to determine tracking alignment of the front wheels 15 and rear wheels 17 as will be explained later in connection with FIG. 10.

In FIGS. 1, 2, 3 and 4, it may be seen that the improved apparatus 25 is mounted at the face of each steerable wheel 15 by means of any suitable mounting attachment 26 which engages the wheel rim flange 27 preferably at three points 28 spaced about the circumference of the flange 27. The attachment 26 has a spindle support plate 29 adjustably carried on three pins 30 by springs 31 slipped over the outer ends of each pin to bear upon the face of the plate 29. Each spring 31 is held by a washer and a cotter pin. In addition to the pins 30 which are equally spaced, the plate 29 carries three equally spaced adjusting screws 32 held under tension in the bosses 33 by springs 34. The screws 32 are located equally between the pins 30 so that by selectively adjusting the screws 32 the plate 29 may be universally tilted relative to the axis X—X of the wheel spindle 20 (FIG. 9) such that the spindle 29a on the plate 29 may be positioned parallel thereto to support a hanger bracket 35 for movement about the axis of the spindle 29a.

Figure 2:
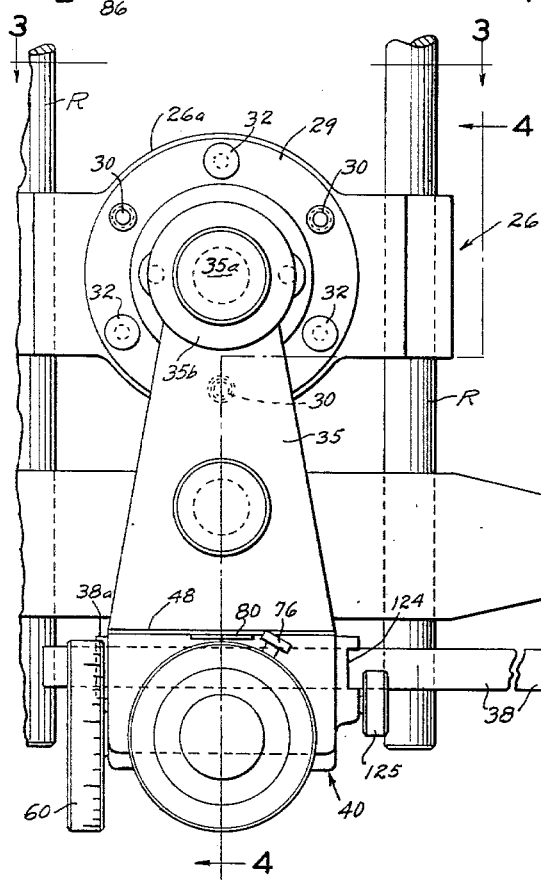
FIG. 2 is an enlarged and fragmentary elevational view of the improved apparatus mounted on the left hand (right front) wheel as seen at line 2—2 in FIG. 1.
Figure 3:
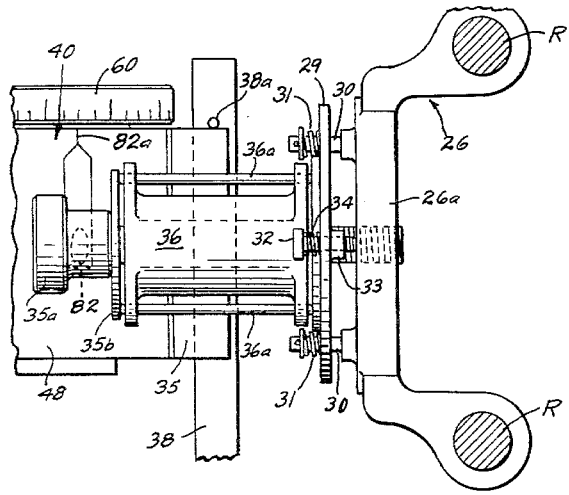
FIG. 3 is a fragmentary sectional view taken at line 3—3 in FIG. 2.
Figure 4:
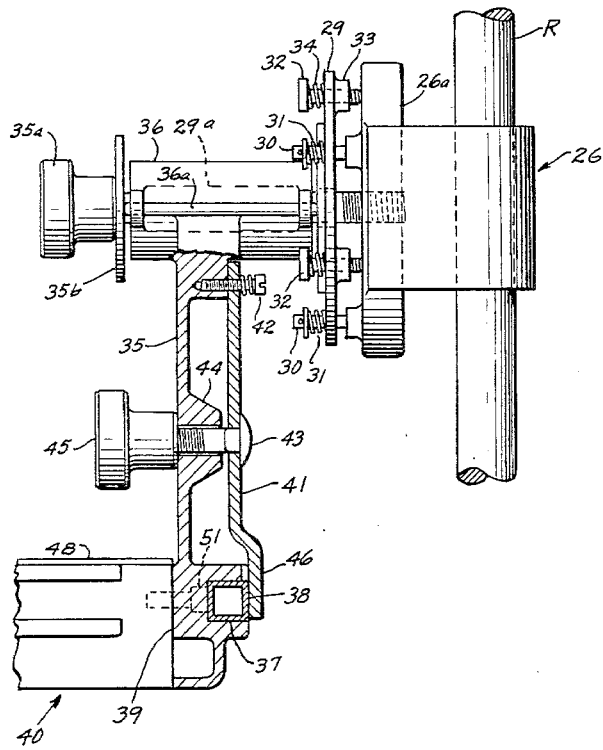
FIG. 4 is a fragmentary and partly sectioned view taken along line 4—4 in FIG. 2.
Figure 6:
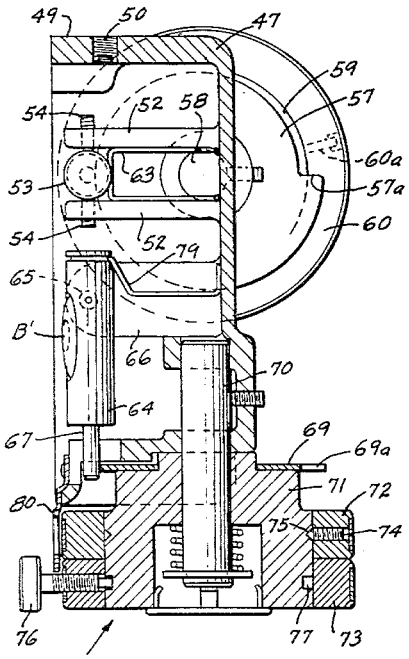
FIG. 6 is a sectional view taken along line 6—6 in FIG. 5.
Figure 5:
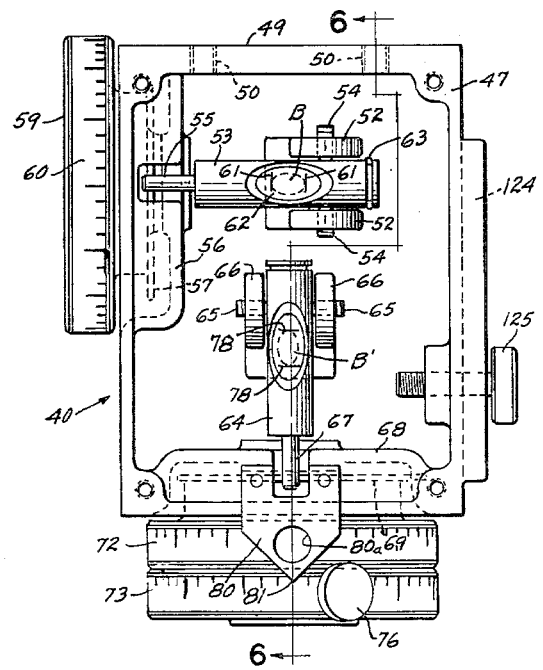
FIG. 5 is a greatly enlarged plan view of a portion of the apparatus seen in FIG. 1.

The hanger bracket 35 has a bearing housing 36 at its upper end for the spindle 29a and a slide way 37 at its lower end (FIG. 4) to receive an extensible arm 38. The lower end of the hanger bracket 35 also has a mounting face 39 to receive a caster-camber device 40. As seen in FIG. 4, the extensible arm 38 is held in position by a retainer plate 41 on the rear surface of the bracket 35. The upper end of the plate 41 is secured by element 42, and the middle portion is engaged by a carriage bolt 43 which extends through a boss 44 to receive a hand nut 45 which tightens the finger 46 on the retainer plate 41 against the open side of the slide way 37 to hold arm 38 in position as desired. As seen in FIGS. 1, 2 and 3, the arm 38 has a stop element 38a to locate the arm in its extended position, and a stop element 38b to locate it in retracted position.

The hanger bracket 35 is normally free to hang pendularly on the spindle 29a while the wheel 15 is rotated during adjustment of plate 29 into the proper position to compensate for wheel run out and to line the spindle 29a parallel to spindle 20. When the bracket 35 is to be secured by a hand nut 35a is threaded inwardly on a thrust washer 35b which engages against the end faces of thrust pins 36a which engage the surface of plate 29 to lock the bracket.

The foregoing description of apparatus 25 is applicable to both right and left wheels of the vehicle, and since it is understood that certain parts may necessarily be either right or left handed while other parts are not, the description and reference numerals given with respect to the apparatus at the right front wheel 15 will apply equally to the left front wheel 15.

In FIGS. 1, 2, 3, 5 and 6, the caster-camber device 40 includes a box like frame 47 closed at the open top by a suitable cover 48. One end wall 49 is formed with bolt holes 50 to receive bolts 51 (FIG. 4) which secure the frame 47 upon the bracket arm 35 with the cover 48 uppermost. The frame 47 has a pair of spaced arms 52 which pivotally support a levelling bubble tube 53 between pivot screws 54. The bubble tube 53 has a projecting finger 55 located in a notch in a frame boss 56 to rest upon the edge of a cam disc 57 rotatably bearinged on a fixed shaft 58 in the boss 56. The shaft 58 extends out of the frame 47 and supports a rotary drum 59 upon the periphery of which is a scale ring 60 suitably calibrated such that it can be set at zero by the set screw 60a when the bubble B in the tube 53 is centered between the index marks 61 on the bubble glass 62 in the usual arrangement. The zero setting for the scale 60 is selected at approximately 180° opposite the end 57a of the cam 57, thereby providing for adjustment of the bubble B in either direction of displacement relative to a zero or levelled position by raising or lowering the finger 55 against the tension of a suitable spring 63.

The frame 47 also supports a second levelling bubble tube 64 by pivot screws 65 carried in spaced arms 66. The tube 64 has a projecting finger 67 located in a notch in a frame boss 68 to rest upon the edge of a cam disc 69 rotatably bearinged on a fixed shaft 70 in the frame 47. The shaft 70 supports a drum 71 on which a pair of scale rings 72 and 73 are mounted. The scale ring 72 is secured to the drum 71 by a lock screw 74 engaged in a locating groove 75, while the scale ring 73 is secured by a thumb screw 76 engaged in a groove 77. The means 60a for securing the scale ring 60 on the drum 59 of the first described mechanism is similar to that shown at 74 and described for scale ring 72. Thus each scale ring 60, 72 and 73 may be rotatably adjusted relative to the drums 59 or 71 upon which they are carried. The cam 69 has its end 69a normally located approximately 180° from the location of the bubble tube finger 67 so that the bubble B' may be located between the centering marks 78. The bubble tube is urged by a suitable spring 79 to pivot such that the finger 67 bears upon the cam 69 to pivot the tube up or down.

The frame 47 carries an index pointer 80 with a point 81 for use with the scale ring 73. The pointer 80 also has an aperture 80a by which the indicia on scale ring 72 may be seen. The cover 48 for the frame is formed with a window 82 (FIG. 3) over the bubble B (FIG. 5) and in a panel area which extends toward the scale ring 60 and is provided with a fixed index line 82a for reading the scale on ring 60. Cover 48 also has a second window 83 (FIG. 1) which is over the bubble B' (FIG. 5) and in a panel area which extends toward the scale ring 72 and is provided with a fixed index 84 for such ring 72. The bubbles B and B' are movable at right angles to each other, with the bubble B' in a vertical plane through the axis of spindle 29a so that the bubble is responsive to the camber and caster attitudes of the wheel 15. The bubble B at right angles to bubble B' is responsive to the king pin inclination of the wheel mounting.

In FIGS. 1, 2, 7 and 8 the apparatus includes a wheel toe measuring device 86 in the form of a box-like frame 87 having a cover plate 88 (FIG. 1) over the open top. The frame 87 has a bearing boss 89 in which a measuring arm 90 is pivotally mounted on shaft 91. The opposite end of arm 90 from its pivot mounting extends toward an aperature 92 and supports a pig-tail element 93 with an eye element 94 thereon. Inwardly of the aperture 92, the arm 90 is provided with an electrical contact element 95 which is insulated therefrom by fibre washers 96. Element 95 is provided with a current lead 97 which extends toward a fastener 98 adjacent the pivot 91, and a light cat-whisker lead 99 connects the lead 97 to a post 100 on a current input receptacle 101 into which a current line 102 (FIG. 2) may be plugged. The opposite post 103 of the receptacle 101 is connected by lead 104 to one side of a buzzer 105 and by lead 106 to a signal lamp 107 housed in a transparent cover 108 on the upper surface of cover 88 where the light may be observed. The lead 109 from the opposite side of buzzer 105 and lead 110 from the opposite side of lamp 107 are connected to the base of a contact element 111 insulatingly mounted by fibre washers 112 adjacent one end of a follower arm 113. The arm 113 is pivoted on shaft 114 in the boss 89 of frame 87 near the measuring arm 90. The follower arm 113 is urged by a suitable spring 115 against a thrust member 116 having fine machine threads thereon engaged in a threaded sleeve 116a fixed in a suitable boss 117. The member carries a rotary drum 118 for a scale ring 119 on which indicia is provided. With the current line 102 plugged into receptacle 101, the buzzer and lamp will be energized whenever the contacts 111 and 95 engage. The firmness of the contact is controlled by the thrust member 116 so that the lamp can be made just to flick on and off. A good solid contact will set off the buzzer for audible signalling, and will cause the lamp to remain on.

The device 86 is secured at the outer end of the arm 38 by screws 87a after the arm has been positioned in a recess 87b formed in the end wall above the aperture 92 for the arm 90. The arm 38 is approximately perpendicular to the arm 90 when the arm is centered in the aperture so that angular deviations from 90° between the arm 38 and arm 90 can be determined by the scale 119.

*Description of operation*

Before describing the operation of the apparatus 25 it should be understood that the apparatus is first checked out to see if all bubbles B and B' center properly to the zero index on the associated scale rings 60, 72 and 73. To accomplish this, the attachment 26 is set on a standard support so that the spindle 29a is horizontal. The bubble B' is then centered so that it agrees with the leveless of the spindle, and the scale ring 72 is turned to the zero mark and the screw 74 is set. The bubble B is set at center between marks 61 and the arm 38 in its extended position is then checked by a separate level gauge to see if it is level. Assuming that both assemblies of devices 40 and 86 and their attachments 26 check out it is now capable of use on a vehicle.

The apparatus 25 is mounted on the steerable wheels 15 of the vehicle as shown in FIGS. 1 to 4. The mounting bracket 26 is adjusted so that the sprindle 29a is parallel with and close to the center of the wheel spindles 20 (FIGS. 1 and 9), and this may be accomplished by sliding the principal support 26a thereof up or down on the two rods R. Taking each wheel 15 in turn in an elevated position so it can rotate freely, the support plate 29 is adjusted by screws 32 to compensate for radial run-out of the wheel. The wheel is lowered and the scale 72 is then adjusted until the bubble B' is centered between its limits 78. The reading on scale 72 opposite index 85 in the aperture 82 will be the wheel camber in degree of angle from the vertical. As indicated in FIG. 9 wheel camber is the angle between the perpendicular P—P and the axis W—W in the plane of the wheel. Since the support plate 29 is first adjusted to the plane of the wheel with the wheel elevated and unloaded, the levelling of the bubble B' will, when the wheel is again loaded, give a direct camber reading. The foregoing operation is performed at each wheel 15 as is understood.

For caster and king pin inclination the wheel 15 while under load (FIG. 1) is turned in approximately 20°, that is the front of the wheel is moved toward the center line of the vehicle. After this is done the levels B and B' are centered by appropriate rotation of the drums 59 and 71 without regard for the readings on scales associated therewith. Without disturbing the levelled condition of the bubbles B and B', the scale ring 60 is rotated on its drum 59 until the zero index is opposite the index 82a. The ring 60 is fixed in this position, after which the scale ring 73 is rotated on drum 71 until the zero idex is opposite point 81. Now the wheel 15 is turned out approximately 20° (a swing of 40° from its former turned-in position) and the bubble B is again centered so that the king pin inclination reading will be read off the scale ring 60 at the index line 82a. Bubble B' is centered by rotating drum 71 so that the caster angle can be determined on scale ring 73 at the point 81. The same procedure is performed on the left front wheel 15. After adjustments are completed under the vehicle, the apparatus can be used to check out the results in like manner.

Toe measurements at both wheels 15 requires the cooperative application of both devices 40 and 86 mounted at the wheels 15 in the manner shown in FIG. 1. After the arms 38 at both wheels are extended, the arms are levelled horizontally by the bubbles B. First it is necessary to adjust the scale ring 60 to zero on its drum 59 so that the bubble B can be truly leveled by moving the arm 38. The leveled arm 38 is fixed by tightening hand nut 35a so that the bracket 35 will not swing out of its vertical position. After both devices are treated in like manner, the interconnecting toe line 120 is hooked into the pig-tail eyes 94. The line 120 is elastic so that there is a desired amount of tension in the connection to draw the arms 90, pig-tails 93 and toe line into straight alignment across the width of the vehicle. The scale ring 119 at each device 86 is adjusted to zero at index line 121 on the cover plate 88.

Now the wheels 15 are turned to a straight ahead position, the electric supply 102 being plugged in to energize the lamps 107 and buzzers 105. In the straight ahead position the lamps 107 and buzzers 105 are not energized. The ahead wheel positions can be checked by observing the position of the steering wheel. If the steering wheel (not shown) is not close to center it may be necessary to adjust the steering linkage under the vehicle until it is centered. Thereafter the toe measurement can proceed as follows.

With the wheels straight ahead, each device 86 is adjusted by turning the scales 119 until the lamps 107 just flick on and off. The wheels 15 are then turned slightly in and out to check on average response between buzzers 105 at each side, this operation being done at one wheel while listening for buzzer noise at each wheel. Readjustment of each scale 119 will bring the setting close to an equal setting at both wheels. The reading on both scales 119 added together is the toe alignment desired.

The toe line 120 keeps arms 90 in straight alignment during the above operation, and rotation of the scales 119 moves the screws 116 in or out to adjust the follower arms 113 to establish the contact at points 95 and 111. The effect of this operation is to measure the angle between the toe line 120 and the arm 38. If this angle T in FIG. 1 is 90° the toe is zero, but if it is greater there is toe-in which is desirable. The angle T is read off the scale in degrees or in some appropriate value equivalent thereto.

It is observed that the devices 86 are useful not only to check wheel toe alignment but to check the steering linkage for center point steering. This is another important advantage and the audible signal of the buzzers 101 assists in this adjustment while working under the vehicle or at one wheel.

*Wheel track measurement*

Turning now to FIG. 10, and with reference to FIGS. 1, 2, 5 and 7, the device 40 is provided with a side slide way 124 to receive the arm 38 therein. A securing screw 125 is provided to lock the arm 38 in the slide way 124 so that it projects (as viewed in FIG. 1) leftwardly and beyond the scales 72 and 73. The right hand assembly of devices 40 and 86 forming the apparatus 25 is moved back and mounted on the right rear wheel 17 in FIG. 10. The attachment is of course checked for run out of the wheel 17. The left assembly of apparatus 25 is likewise moved back and mounted on the left rear wheel with the run out checked. This locates the respective pig-tails 93 facing forward toward the front wheels 15. The arms 38 are levelled as heretofore explained. Then the toe line 120 is hooked to a pig-tail 93 and stretched along the right side of chassis 14 to a measuring rod 126. The line 120 is moved in or out along the rod 126 until the lamp 107 just flicks off. Prior to this the scale 119 is set at zero for a true 90° angular setting between arm 90 and arm 38. A mark is read on rod 126.

The same operation is performed at the left side of chassis 14 with the measuring rod 126 placed at the same relative position on the chassis. If the two marks are the same the rear wheels 17 and axle housing 13 are squared to the longitudinal center of the chassis 14 and are tracking with the front wheels 15. If the marks are different the amount of out-of-track can be determined directly and adjustment of the axle housing 13 should be made to rectify the error.

The foregoing description of apparatus and its operation has set forth the salient features of this invention. It has also disclosed the range of utility thereof in sufficient detail to inform those skilled in this art how the apparatus is constructed and used. The simplicity and accuracy of the preferred embodiment of the invention should now be understood and appreciated in view of the stated objects and all of the advantages pointed out herein or inferred from this specification. It is, therefore, the aim to include all changes, modifications and equivalent devices and components in the scope of the appended claims.

What is claimed is:

1. In alignment apparatus for vehicle wheels: a first device mounted adjacent the face of each of a pair of wheels, each of said first devices including a spindle centerable to the adjacent wheel axis, a bracket operably mounted on said spindle, an arm projecting from said first device, and means to level said arm; a second device mounted on an arm of each of said first devices, each second device including a movable measuring lever extending to intersect said arm on a first device, calibrated finder means carried by said second device to find the moved position of said measuring lever, signal means operably responsive to said finder means to create a signal upon finding the moved position of said measuring lever; and a line interconnecting said measuring levers of said second devices to cause said levers to assume aligned positions relative to the pair of wheels, said finder calibrations indicating the angular intersecting relationship of said measuring levers with the arms on said first devices.

2. In alignment apparatus for vehicle wheels: a first device mounted adjacent the face of each of a pair of wheels, each of said first devices including a spindle centered to the axis of the adjacent wheel, a bracket operably hung from said spindle, an arm extending from said first device adjacent the wheel face, and means to level said arm in a horizontal plane; a second device carried by an arm of each of said first devices, each second device including a lever movable in a horizontal plane and extending in a direction to intersect the arm on a first device, finder means carried by said second device to find the moved position of said lever, signal means operably responsive to said finder means to create a signal upon finding the moved position of said lever; and an elastic line interconnecting said levers of said second devices to align said levers relative to the pair of wheels, said elastic line maintaining the alignment of said levers and said finder means being calibrated to indicate the angular position of intersection of each lever with its arm on said first devices.

3. In alignment apparatus for vehicle wheels; a first device mounted adjacent the face of each of a pair of wheels, each of said first devices including a spindle centerable to the adjacent wheel, a bracket operably mounted on said spindle to hang pendently therefrom, an arm projecting from said first device, and means on said first device to measure levelness of said arm; a second device mounted on an arm of each said first devices, each of said second devices including a movable measuring lever extending in a direction to intersect said arm on a first device, a follower lever adjacent said measuring lever, a thrust member operable to displace said follower lever toward said measuring lever, electrical contacts cooperatively carried by said levers, signal means in electrical circuit with said contacts; and a line connecting said measuring levers in each of said second devices and causing said measuring levers to assume aligned positions relative to the pair of wheels, said thrust member in each of said second devices being calibrated to indicate the angles of intersection of each measuring lever with the arm on a first device.

4. A vehicle wheel toe measuring device having means attaching the device to the face of the wheel, an arm extending horizontally from said attaching means to an outer end and assuming a position parallel with the wheel face, a lever carried on the outer end of said arm, said lever being movable from a position of perpendicularity to said arm in response to wheel toe variations, means to indicate the position of said lever including a thrust element and a scale to follow said thrust element, said scale being calibrated for wheel toe values, and signal means responsive to said lever and indicating means for creating a signal simultaneously with said thrust element indicating the position of said lever.

5. The toe measuring device set forth in claim 4 wherein said signal means includes a lamp, a first contact movable with said lever and a second contact movable with said indicating means to engage said first contact, and an electrical circuit including said lamp and contacts to energize said lamp and give a visual signal.

6. In wheel alignment measuring apparatus having a pair of brackets each movable about an axis held in parallelism with the axis of the wheel closest thereto of a pair of wheels to be measured, an arm extending from each said bracket along the adjacent wheel face in a radial direction, a wheel toe device carried at the outer end of each of said arms, each device including a pivot and an element mounted on said pivot and extending transversely of said arm, and a flexible line interconnecting said elements in each device to simultaneously form the said elements into one leg of an angle indicative of wheel toe, said arms forming another leg of the angle, and each of said wheel toe devices having calibrated means for measuring the angle between its supporting arm and said interconnecting means and indicating the difference between the said angle and ninety degrees.

7. In the wheel alignment apparatus set forth in claim 6, a level supported by each of said brackets in position to indicate when said bracket arms are horizontal, and means carried by at least one of said wheel toe devices to be responsive to wheel movement for producing a signal.

References Cited by the Examiner

UNITED STATES PATENTS

| | | | |
|---|---|---|---|
| 1,324,388 | 12/19 | Duby | 33—203.2 |
| 1,922,344 | 8/33 | Bagge | 33—203.17 |
| 2,160,226 | 5/39 | Phillips | 33—203.18 X |
| 2,522,916 | 9/50 | Zeigler | 33—203.2 |
| 2,532,593 | 12/50 | Bender et al. | 33—203.2 |
| 2,554,621 | 5/51 | Jacobsen et al. | 33—203.18 |
| 2,581,630 | 1/52 | Carrigan | 33—203.18 |
| 2,624,123 | 1/53 | Wilkerson | 33—203.2 |
| 2,972,189 | 2/61 | Holub | 33—46.2 |

LOUIS R. PRINCE, *Primary Examiner.*

ISAAC LISANN, *Examiner.*